United States Patent [19]

Manabe et al.

[11] Patent Number: 4,458,030

[45] Date of Patent: Jul. 3, 1984

[54] ADSORBENT COMPOSITION

[75] Inventors: Tadashi Manabe, Kagawa; Shigeo Miyata, Takamatsu, both of Japan

[73] Assignee: Kyowa Chemical Industry Co., Ltd., Tokyo, Japan

[21] Appl. No.: 500,398

[22] Filed: Jun. 2, 1983

[30] Foreign Application Priority Data

Jun. 4, 1982 [JP] Japan ................................. 57-94792

[51] Int. Cl.$^3$ ........................ B01J 21/04; B01J 21/18; B01J 23/02; B01J 23/06
[52] U.S. Cl. .................................... 502/183; 502/414; 502/417
[58] Field of Search ....................... 502/183, 414, 417

[56] References Cited

U.S. PATENT DOCUMENTS

| | | | |
|---|---|---|---|
| 2,413,184 | 12/1946 | La Lande | 502/414 |
| 3,651,159 | 3/1972 | Long et al. | 502/414 |
| 3,876,451 | 4/1975 | Zall | 502/414 |

*Primary Examiner*—W. J. Shine

*Attorney, Agent, or Firm*—Sherman & Shalloway

[57] ABSTRACT

An adsorbent composition consisting essentially of
(i) about 5 to about 95% by weight of a hydrotalcite compound represented by the following formula (1)

$$(M^{2+})_x Al_2(OH)_{2x+6-ny}(A^{n-})_y \cdot mH_2O \qquad (1)$$

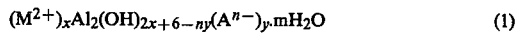

wherein
$M^{2+}$ represents $Mg^{2+}$ and/or $Zn^{2+}$,
$A^{n-}$ represents an anion having a valence of n, and
x, y and m are numbers which satisfy the following conditions $$x \geq 1,\ 0 < y < 2,\ m > 0,$$

or a product of calcination at a temperature of up to about 800° C. of said hydrotalcite compound, and
(ii) about 95 to about 5% by weight of activated carbon.

5 Claims, No Drawings

ADSORBENT COMPOSITION

This invention relates to an adsorbent composition (to be referred to as a composite adsorbent in this application) comprising a combination of a hydrotalcite compound and activated carbon. The composition has an excellent adsorptive power for a variety of substances which is synergistic and cannot be expected from the adsorptive powers of the individual constituents of the composition.

More specifically, this invention relates to an adsorbent composition consisting essentially of (i) about 5 to about 95% by weight of a hydrotalcite compound represented by the following formula (1)

$$(M^{2+})_x Al_2(OH)_{2x+6-ny}(A^{n-})_y \cdot mH_2O \tag{1}$$

wherein
$M^{2+}$ represents $Mg^{2+}$ and/or $Zn^{2+}$,
$A^{n-}$ represents an anion having a valence of n, and
x, y and m are numbers which satisfy the following conditions $$x \geq 1,\ 0 < y < 2,\ m > 0,$$

or a product of calcination at a temperature of up to about 800° C. of said hydrotalcite compound, and (ii) about 95 to about 5% by weight of activated carbon.

Activated carbon has been used widely as a multipurpose adsorbent. But the adsorptive power of activated carbon is insufficient for adsorption of organic acids such as carboxylic acids and sulfonic acids, decolorization of waste liquors containing acid dyes such as Methylene Blue and Amaranth, and adsorption of alkalies. On the other hand, hydrotalcite compounds and magnesium oxide do not show an effective adsorptive power for the adsorption of phenols and amines.

It has therefore been virtually impossible to remove various substances by adsorption with one type of adsorbent, and it is the previous practice to perform a complicated and disadvantageous adsorption process involving several adsorbing and removing operations using different types of adsorbent.

The present inventors worked extensively in order to provide an adsorbent which can obviate such a complicated and disadvantageous operation.

Consequently, they have found that a composite adsorbent comprising as active ingredients the hydrotalcite compound of formula (1) or its calcination product and activated carbon exhibits an effective and excellent adsorptive power for a wide range of substances. It has also been found that the adsorptive power of the composite adsorbent is synergistic and cannot at all be expected from the adsorptive powers of the individual constituents of the composite adsorbent.

The present inventors have further found that as shown in the experimental results in Examples and Comparative Examples given hereinbelow, the composite adsorbent shows an increased adsorptive power for substances which the hydrotalcite compound alone cannot substantially adsorb, such as formaldehyde, phenol and triethanolamine, which adsorptive power is quite unexpected from the adsorptive power of activated carbon alone. They presume that this is because in the composite adsorbent, some interaction different from a mere mixed state of the two constituents, for example, interaction which causes some change in the surface structure of activated carbon, will take place.

Thus, it has been found that by using the composite adsorbent of this invention, the removal or recovery of substances by adsorption can be carried out by one operation, and the repetition of such operation in the prior art is no longer necessary.

It is an object of this invention therefore to provide a new type of composite adsorbent.

The above and other objects and advantages of this invention will become apparent from the following description.

In the composite adsorbent of this invention, the hydrotalcite compound to be used in combination with activated carbon may be represented by the following formula (1).

$$(M^{2+})_x Al_2(OH)_{2x+6-ny}(A^{n-})_y \cdot mH_2O \tag{1}$$

wherein
$M^{2+}$ represents $Mg^{2+}$ and/or $Zn^{2+}$,
$A^{n-}$ represents an anion having a valence of n, and
x, y and m are numbers which satisfy the following conditions $$x \geq 1,\ 0 < y < 2,\ m > 0$$

The n-valent anion $A^{n-}$ in formula (1) is preferably a mono- to tetra-valent anion. Specific examples are $Cl^{\ominus}$, $NO_3^{\ominus}$, $CO_3^{(2-)}$, $SO_4^{(2-)}$,

, $Fe(CN)_6^{(3-)}$ and $Fe(CN)_6^{(4-)}$.

In formula (1), x is preferably $2 < x < 8$, more preferably $3 < x < 6$, and m is preferably $10 > m > 0$.

The hydrotalcite compound of formula (1) may also be used in the form of its calcination product. The calcination is carried out preferably at a temperature of up to about 800° C. If the calcination is too high, the activity of the resulting composite adsorbent tends to decrease. There is no particular lower limit to the calcination temperature. But when the hydrotalcite is to be used in the form of a calcination product, the calcination is preferably carried out at a temperature of at least about 400° C. Preferably, the hydrotalcite compound has a relatively high BET specific surface area, for example a BET specific surface area of about 50 to about 200 m²/g. Preferably, the hydrotalcite compound has a relatively small particle diameter. Selection of secondary particle diameters of about 0.1 to about 10 microns, preferably about 0.1 to about 5 microns is advantageous because it will result in a composite adsorbent in the form of a molded article such as pellets which has high mechanical strength.

There is no particular restriction on activated carbon which is another constituent of the composite adsorbent of this invention.

The form of the composite adsorbent of this invention may be properly chosen. It may be in the form of a molded article of various shapes such as a powder or pellets. Preferably, it is used in the form of a molded article of a suitable size and shape chosen in view of its operability such as the rate of passing a liquid through a column of the adsorbent and the continuation of the adsorbing operation. The molded article can be formed easily by mixing the two constituents, if required in the presence of a binder, and pelletizing the mixture into the desired form. For example, fine powders of the two components are mixed together with a suitable binder such as water and polyvinyl alcohol, and the mixture is kneaded and molded by means known per se. The mixture can be molded into a desired shape such as a hollow cylinder, a sphere, a solid cylinder, or a polygonal prism having a diameter of about 1 to about 50 mm, dried and calcined. By such a molding operation, a uniform and dense composite adsorbent can be obtained.

The hydrotalcite of formula (1) used in the composite adsorbent of this invention may be available in the market, or may be produced by methods known per se. For example, it can be produced by reacting an aqueous solution of a water-soluble Mg compound and/or a water-soluble Zn compound, such as magnesium chloride, magnesium sulfate, zinc chloride and zinc sulfate with an aqueous solution of a water-soluble Al compound such as aluminum chloride, aluminum sulfate and sodium aluminate together with an aqueous solution of an alkali such as sodium hydroxide, potassium hydroxide, ammonia, sodium carbonate and sodium oxalate. When an aqueous solution of a zinc salt is used in this reaction, it is preferred to carry out the reaction at a pH of at least about 6. When an aqueous solution of a magnesium salt is used, the reaction is carried out preferably at a pH of at least about 8.

In the composite adsorbent of this invention, the proportions of the hydrotalcite compound of formula (1) or a product of calcination at a temperature of up to about 800° C. of the compound of formula (1) and activated carbon can be properly chosen. Preferably, they are selected such that the composite adsorbent consists of about 5 to about 95% by weight of the former and about 95 to about 5% by weight of the latter, preferably about 30 to about 70% by weight of the former and about 70 to about 30% by weight of the latter. The proportions of these components can be properly changed depending upon the type of a substance to be adsorbed. If the proportion of either one of these components is too small, the synergistic effect is difficult to achieve. Hence, the proportions specified above are suitable.

The composite adsorbent of this invention can be used for adsorption of a wide variety of substances. For example, it is useful for adsorption of $CN^-$, $CrO_4^{2-}$, $AsO_4^{3-}$, etc. in spent plating baths, various dyes in dye-containing waste waters, lignin in pulp spent liquors, uranium in sea water, oils in oil-containing waste waters, a phosphate ion in household waste liquors, a fluorine ion in waste liquors from semiconductor factories, cobalt and chlorine ions in cooling water for nuclear reactors, proteins in fermentation discharge liquors, and caffeine; secondary treatment of waste waters; removal of $NO_x$ and $SO_2$ from air; removal of ammonia; removal of water (as a dehydrating agent); removal of $CO_2$; decolorization of sucrose, seasonings, and wines and liquors; deoxidation of foodstuffs for storage; deoxidation, decolorization and deodorization of high-grade edible oils; regeneration of spent oils; removel of mercury-containing agricultural chemicals; purification of citric acid and food additives; purification of purified water (removal of odoriferous and tasty substances); decolorization and purification of surface-active agents, plasticizers, oiling agents, etc.; recovery of dry cleaning solvents; purification of antibiotics, vitamins, etc.; recovery of acetone, toluene, $CS_2$, methyl ethyl ketone, mixed solvents, etc.; removal of nicotine from tobacco; and removal of hydrogen sulfide, methylmercaptan, methyl sulfide, methyl disulfide and trimethylamine.

The following examples illustrate the present invention more specifically.

EXAMPLE 1

Four kilograms of a fine powder of a hydrotalcite compound of the formula $Mg_4Al_2(OH)_{12}CO_3.3H_2O$ having a BET specific surface area of 120 $m^2/g$ and 3 kg of a commercially available activated carbon powder were put in a kneader and mixed fully. Then, with kneading, 45 kg of water was gradually poured, and they were kneaded for about 30 minutes. The kneaded mixture was molded by an extruder into hollow-cylindrical pellets having a diameter of 15 mm. The pellets were calcined at about 600 C. for 1 hour to obtain a composite adsorbent. Adsorption of Amaranth, triethanolamine, phenol, stearic acid, and acetic acid was performed by using the resulting adsorbent. The results are shown in Table 1.

EXAMPLE 2

Five kilograms of a powder of a hydrotalcite compound of the formula $Mg_6Al_2(OH)_{16}CO_3.4H_2O$ having a BET specific surface area of 96 $m^2/g$ and 5 kg of a powder of activated carbon were pelletized in the same way as in Example 1 except that polyvinyl alcohol was used instead of water. The pellets were then dried at about 120° C. for 10 hours. The resulting adsorbent was subjected to the activity test shown in Table 1. The results are also shown in Table 1.

EXAMPLE 3

Five kilograms of a powder of a hydrotalcite compound of the formula $Zn_5Al_2(OH)_{14}Cl_2.4.5H_2O$ having a BET specific surface area of 72 $m^2/g$ and 6 kg of a powder of activated carbon were pelletized in the same way as in Example 1. Then, the pellets were dried at 400° C. for 1 hour to obtain a composite adsorbent. The resulting adsorbent was subjected to the activity test shown in Table 1. The results are shown in Table 1.

Table 1 also shows the results of activity tests conducted on the hydrotalcite compound and activated carbon used in Example 1 (Comparative Examples 1 and 2). The amount of each of these adsorbent components was the same as that of the composite adsorbent used in Example 1.

METHOD OF TESTING THE ACTIVITY OF ADSORBENT (1) Adsorption of acetic acid

One hundred milligrams of the adsorbent was added to 100 ml of an aqueous solution of acetic acid in a concentration of 100 ppm. The mixture was shaken at 25° C. for 1 hour, and then filtered. The concentration of acetic acid in the filtrate was measured by titration with a 0.01N aqueous solution of KOH.

(2) Adsorption of Amaranth (dye)

Five hundred milligrams of the adsorbent was added to 100 ml of an aqueous solution of Amaranth in a concentration of 235 ppm. The mixture was shaken at 25° C. for 1 hour, and then filtered. The concentration of Amaranth in the filtrate was determined by an absorptiometer.

(3) Absorption of stearic acid

One hundred milligrams of the adsorbent was added to 50 g of a DPG (dipropylene glycol) solution containing stearic acid in a concentration (acid value) of 0.457. The mixture was stirred at 105° C. for 1 hour. Subsequently, the mixture was immediately cooled with ice, and centrifuged. The supernatant liquid was taken, and neutralized and titrated with a methanol-water solution of KOH.

(4) Adsorption of formaldehyde

Two grams of the adsorbent was added to an aqueous solution of formaldehyde in a concentration of 1000 ppm. The mixture was shaken at 25° C. for 1 hour, and then filtered. The filtrate was taken and made alkaline by adding an aqueous KOH solution. Then, iodine was added, and the excess iodine was subjected to back titration with an aqueous solution of $Na_2S_2O_3$ under acidity.

(5) Adsorption of phenol

One gram of the adsorbent was added to 100 ml of an aqueous solution of phenol in a concentration of 500 ppm. The mixture was shaken at 250° C. for 1 hour, and then filtered. The filtrate was taken, and hydrochloric acid and a mixed aqueous solution of potassium bromate and potassium bromide were added. They were fully mixed, and potassium iodide was added. Then, free iodine was titrated with an aqueous solution of $Na_2S_2O_3$.

(6) Adsorption of triethanolamine

Two grams of the adsorbent was added to 100 ml of an aqueous triethanolamine solution in a concentration of 500 ppm. The mixture was shaken at 25° C. for 1 hour, and then filtered. The filtrate was analyzed for determination of nitrogen.

TABLE 1

| | Adsorption activity test | | | | |
|---|---|---|---|---|---|
| | Adsorption activity test (mg/g) (*3) | | | | |
| Substances to be adsorbed | Example 1 | Comparative Example 1 (hydrotalcite compound) (*1) | Comparative Example 2 (activated carbon) (*2) | Example 2 | Example 3 |
| Acetic acid | 490 | 280 | 35 | 305 | 410 |
| Amaranth (acid dye) | 568 | 145 | 82 | 142 | 492 |
| Stearic acid | 335 | 152 | 38 | 153 | 304 |
| Formaldehyde | 46 | 0.3 | 14 | 55 | 41 |
| Phenol | 26 | 0.5 | 21 | 25 | 25 |
| Triethanolamine | 61 | 0 | 45 | 48 | 58 |

(*1): Same as used in Example 1;
(*2): Same as used in Example 1;
(*3): The weight of the substance adsorbed per gram of the adsorbent.

EXAMPLE 4

Four kilograms of a fine powder of a hydrotalcite compound of the formula $Mg_5Al_2(OH)_{14}CO_3\cdot 4H_2O$ having a BET specific surface area of 60 m²/g, 4 kg of commercial activated carbon powder and 1 kg of synthetic apatite of the formula $Ca_5(PO_4)_3(OH)$ and 2 kg of water as a binder were mixed and kneaded. The mixture was molded into pellets having a diameter of 3 mm and a length of 5 mm. The pellets were then calcined at 600° C. for 1 hour to form a composite adsorbent.

To a 20% aqueous solution of crude sugar was added the resulting composite adsorbent in an amount corresponding to 1% of the dry weight of the crude sugar. The mixture was stirred at 70 to 75° C. for 1 hour, and centrifuged by a centrifugal separator at 9800 rpm. The color, the amino acid concentration and the turbidity (two days after the treatment) of the resulting supernatant were determined. The amino acid was analyzed by ninhydrin reaction followed by colorimetry.

The same crude sugar solution was also purified by using commercial activated carbon (KV-3, a product of Futamura Kagaku K.K.) and magnesium oxide (BET surface area 40m²/g) respectively.

The results are shown in Table 2.

TABLE 2

| Run | Adsorbent | Color (by visual observation) | Absorbance (at 415 mμ) | Ratio of adsorption of amino acid % | Turbidity |
|---|---|---|---|---|---|
| Example 4 | Composite adsorbent | Pale yellow | 0.05 | 80 | Clear |
| Comparative Example 3 | Activated carbon | Pale brown | 0.12 | 50 | Turbid |
| Comparative Example 4 | Magnesium oxide | Pale brown | 0.36 | 50 | Clear |
| Control | None | Deep brown | 0.66 | 0 | Slightly turbid |

What is claimed is:

1. An adsorbent composition consisting essentially of (i) about 5 to about 95% by weight of a hydrotalcite compound represented by the following formula (1)

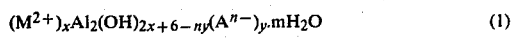

$$(M^{2+})_xAl_2(OH)_{2x+6-ny}(A^{n-})_y\cdot mH_2O \qquad (1)$$

wherein $M^{2+}$ represents $Mg^{2+}$ and/or $Zn^{2+}$, $A^{n-}$ represents an anion having a valence of n, and x, y and m are numbers which satisfy the following conditions $x \geq 1, 0 < y < 2, m > 0,$ or a product of calcination at a temperature of up to about 800° C. of said hydrotalcite compound, and (ii) about 95 to about 5% by weight of activated carbon.

2. The adsorbent composition of claim 1 wherein in formula (1) representing the hydrotalcite compound, x, y and m are numbers which satisfy the following conditions $8 > x > 2, 0 < y < 2,$ and $10 > m > 0.$ 3. The adsorbent composition of claim 1 wherein $A^{n-}$ in formula (1) representing the hydrotalcite compound is an anion selected from the group consisting of $Cl^-$, $NO_3^-$, $CO_3^{2-}$, $SO_4^{2-}$,

$Fe(CN)_6^{3-}$ and $Fe(CN)_6^{4-}$.

4. The adsorbent composition of claim 1 which is in the form of a molded article formed by using a binder.

5. The adsorbent composition of claim 1 which consists of about 30 to about 70% by weight of the hydrotalcite compound (i) and about 70 to about 30% by weight of activated carbon (ii).

UNITED STATES PATENT AND TRADEMARK OFFICE
CERTIFICATE OF CORRECTION

PATENT NO. : 4,458,030
DATED : July 3, 1984
INVENTOR(S) : TADASHI MANABE, ET AL

It is certified that error appears in the above—identified patent and that said Letters Patent is hereby corrected as shown below:

Claim 3, line 4, should read: "$NO_3^{\ominus}$".

Signed and Sealed this

Twenty-fifth Day of December 1984

[SEAL]

Attest:

GERALD J. MOSSINGHOFF

*Attesting Officer*     *Commissioner of Patents and Trademarks*